United States Patent [19]

Fischer

[11] Patent Number: 5,613,703
[45] Date of Patent: Mar. 25, 1997

[54] APPARATUS FOR INFLATING AN INFLATABLE VEHICLE OCCUPANT PROTECTION DEVICE

[75] Inventor: Craig M. Fischer, Mesa, Ariz.

[73] Assignee: TRW Vehicle Safety Systems Inc., Lyndhurst, Ohio

[21] Appl. No.: 551,677

[22] Filed: Nov. 1, 1995

[51] Int. Cl.⁶ .................................................. B60R 21/26
[52] U.S. Cl. .................................... 280/737; 137/68.19
[58] Field of Search .................................. 280/737, 740, 280/741, 742; 222/5, 83; 137/68.13, 68.19, 68.23, 68.22

[56] References Cited

U.S. PATENT DOCUMENTS

| | | |
|---|---|---|
| Re. 28,164 | 9/1974 | Stephenson . |
| 3,721,456 | 3/1973 | McDonald . |
| 3,777,772 | 12/1973 | Arnold et al. . |
| 3,834,729 | 9/1974 | Oka et al. . |
| 3,862,767 | 1/1975 | Chute . |
| 3,891,233 | 6/1975 | Damon . |
| 5,031,932 | 7/1991 | Frantom et al. ............... 280/741 |
| 5,199,740 | 4/1993 | Frantom et al. ............... 280/741 |
| 5,388,859 | 2/1995 | Fischer et al. ................ 280/737 |

*Primary Examiner*—Paul N. Dickson
*Attorney, Agent, or Firm*—Tarolli, Sundheim, Covell, Tummino & Szabo

[57] ABSTRACT

An air bag inflator (10) includes a container (14) and an isolation membrane (100). The container (14) contains inflation fluid under pressure, and has a discharge opening (40) for discharging a flow of the inflation fluid. The isolation membrane (100) is located between the discharge opening (40) and the ambient atmosphere, and provides a hermetic seal which isolates the discharge opening (40) from the ambient atmosphere. The inflator further includes a baffle ring (140) between the discharge opening (40) and the isolation membrane (100). The baffle ring (140) shields the isolation membrane (100) from direct impingement by the flow of inflation fluid emerging from the discharge opening (40) to protect the isolation membrane (100) from being fragmented by the flow of inflation fluid. The baffle ring (140) also applies a fluid pressure force to the isolation membrane (100) to open the hermetic seal.

15 Claims, 4 Drawing Sheets

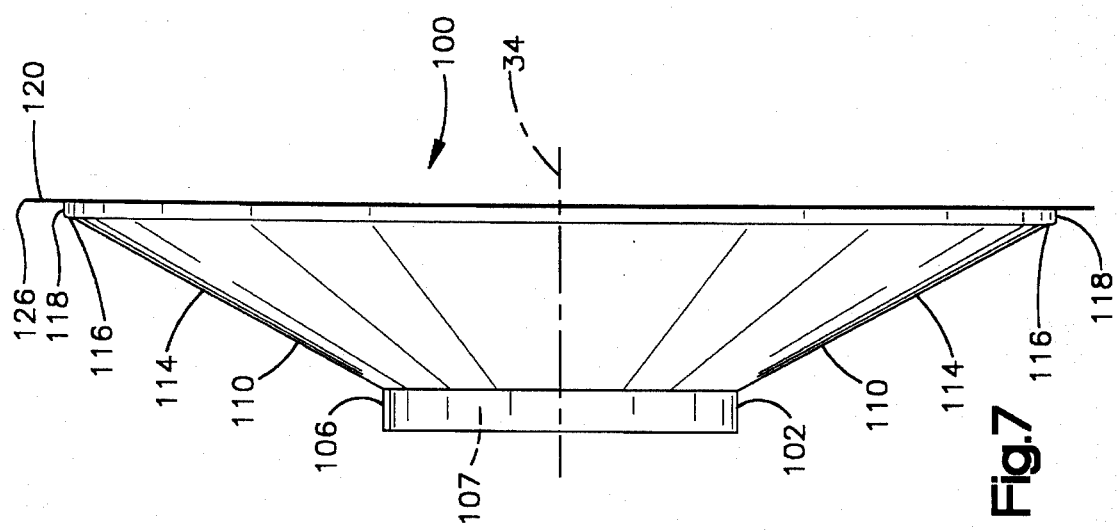
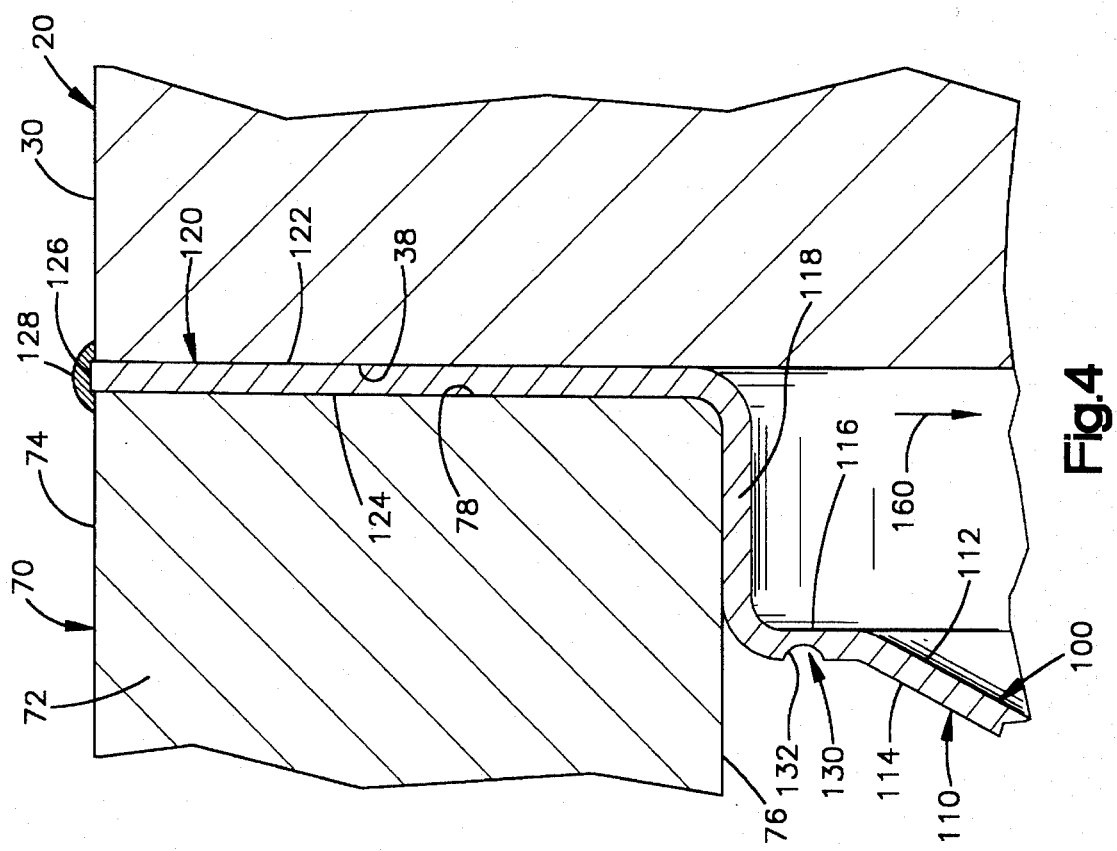

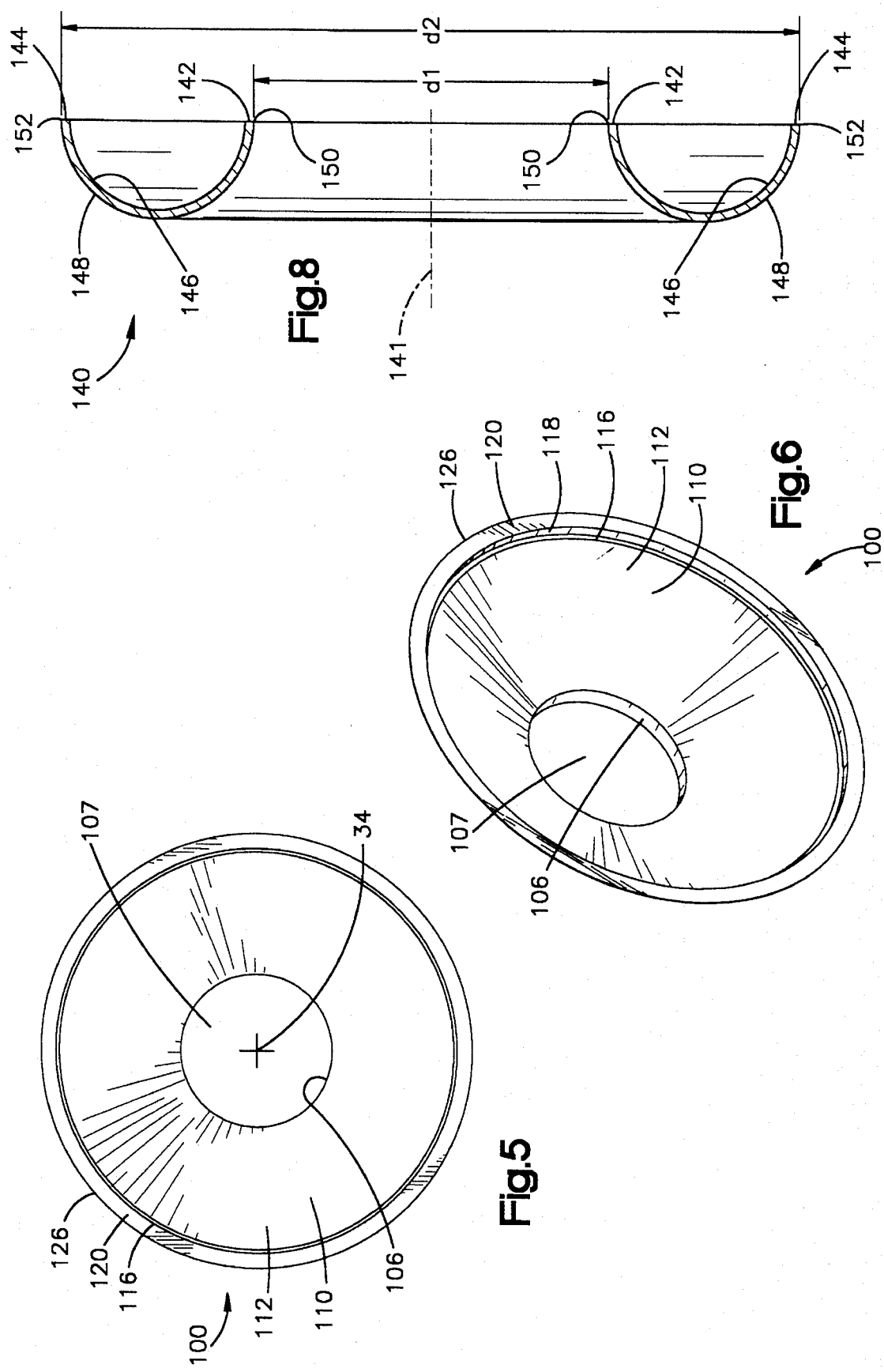

APPARATUS FOR INFLATING AN INFLATABLE VEHICLE OCCUPANT PROTECTION DEVICE

TECHNICAL FIELD

The present invention relates to an apparatus for inflating an inflatable vehicle occupant protection device, such as an air bag. More particularly, the present invention relates to an air bag inflator with a seal for blocking conduction of ambient moisture into the inflator.

BACKGROUND OF THE INVENTION

There are many known air bag inflator constructions. Some inflator constructions include combustible gas generating material. A known inflator construction includes a combination of stored gas and combustible gas heating material. Upon ignition of the gas heating material, the stored gas is heated, and there is a resulting increase in fluid pressure. The increased fluid pressure ruptures a member to release the stored gas from the inflator for flow into an air bag. The gas flows through discharge openings in a housing of the inflator into the air bag.

The combustible gas heating material may be subject to degradation if exposed to moisture in the ambient atmosphere of the inflator. Accordingly, inflators include some means to block the moisture in the ambient atmosphere from contacting the gas heating material. One means to block the moisture is a metal foil seal adhesively secured to a surface of the inflator housing across the discharge openings. The metal foil seal forms a moisture barrier between the gas heating material inside the inflator and the environment outside the inflator. When the inflator is actuated, the pressure of the gas flowing through the discharge openings ruptures the metal foil seal.

SUMMARY OF THE INVENTION

In accordance with the present invention, an apparatus for inflating an inflatable vehicle occupant protection device, such as an air bag, comprises container means and closure means. The container means contains inflation fluid under pressure, and has a discharge opening for discharging a flow of the inflation fluid. The closure means releases the inflation fluid to flow outward through the discharge opening upon rupturing of the closure means.

The apparatus further comprises isolator means and baffle means. The isolator means is located between the discharge opening and the ambient atmosphere, and provides a hermetic seal which isolates the discharge opening from the ambient atmosphere. The baffle means is located between the discharge opening and the isolator means. The baffle means shields the isolator means from direct impingement by the flow of inflation fluid emerging from the discharge opening. In this manner, the baffle means helps to prevent the isolator means from being fragmented by the flow of inflation fluid. The baffle means also applies an inflation fluid pressure force to the isolator means so as to open the hermetic seal under the influence of the flow of inflation fluid.

In a preferred embodiment of the present invention, the discharge opening is one of a plurality of similar discharge openings in a circular array. The baffle means comprises a baffle ring which is unattached to the container means. The baffle ring is coaxial with the circular array of discharge openings. A concave inner side surface of the baffle ring extends radially and circumferentially across the circular array of discharge openings. A convex outer side surface of the baffle ring abuts an inner side surface of the isolator means. When the flow of inflation fluid emerges from the discharge openings, it moves forcefully against the concave inner side surface of the baffle ring. The flow of inflation fluid then moves the convex outer side surface of the baffle ring forcefully against the isolator means to open the hermetic seal by rupturing a predefined rupturable portion of the isolator means.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is a further enlarged fragmentary sectional view of a portion of the inflator prior to actuation;

FIG. 5 is an axial end view of a part of the inflator;

FIG. 6 is a perspective view of the part shown in FIG. 5;

FIG. 7 is a side view of the part shown in FIG. 5; and

FIG. 8 is a side view, partly in section, of another part of the inflator.

DESCRIPTION OF A PREFERRED EMBODIMENT

Figure 1:
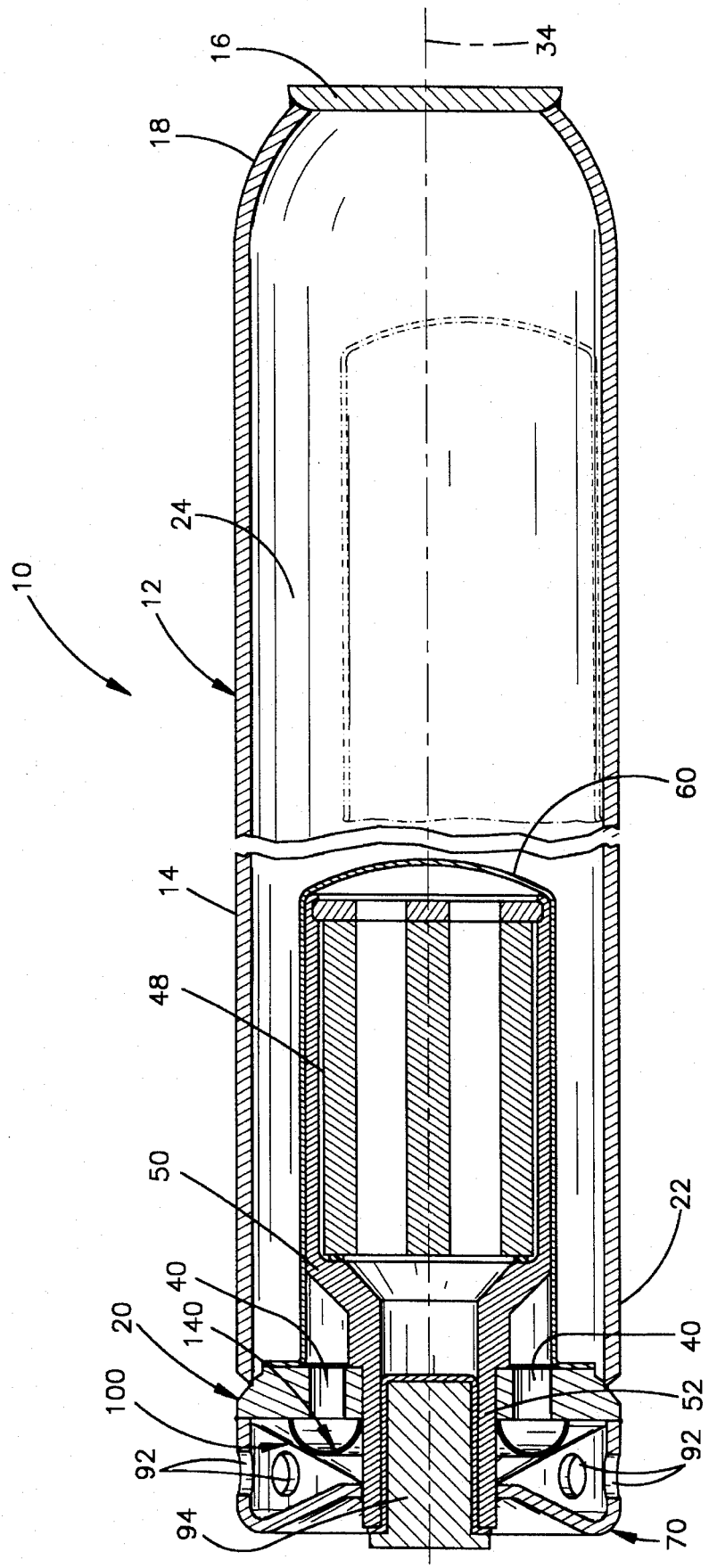
FIG. 1 is a sectional view of an inflator constructed in accordance with the present invention.

The present invention relates to an inflator, and particularly relates to an inflator for inflating a vehicle occupant protection device such as an air bag. The present invention is applicable to various inflator constructions. As representative of the present invention, FIG. 1 illustrates an inflator 10.

The inflator 10 includes a housing 12. The housing 12 includes a cylindrical container 14 extending around a longitudinal central axis 34 of the inflator 10. An end cap 16 is attached by a circumferential weld to one end portion 18 of the container 14. An orifice plate 20 is attached by a circumferential weld to the opposite end portion 22 of the container 14.

The container 14, the end cap 16, and the orifice plate 20 together define a chamber 24 in the housing 12. The chamber 24 holds a supply of stored inflation fluid. The stored inflation fluid is preferably 95% argon and 5% helium, and is preferably stored in the chamber 24 at a pressure of approximately 2,000 to 3,500 psi. Other gases could be stored in the chamber 24, and the gases could be stored at different pressures. For example, air or nitrogen or a mixture of gases could be stored in the chamber 24.

The orifice plate 20 (FIGS. 1 and 2) has an outer circumferential surface 30 and an inner circumferential surface 32. The orifice plate 20 has parallel inner and outer side surfaces 36 and 38 which are perpendicular to the axis 34. A plurality of circular discharge openings 40 are formed in the orifice plate 20 and extend axially between the inner and outer side surfaces 36 and 38. The discharge openings 40 are arranged in a circular array centered on the axis 34. Although only two discharge openings 40 are shown in FIG. 1, it should be understood that there are a greater number of discharge openings formed in the orifice plate 20.

A body of combustible gas heating material 48 (FIG. 1) is disposed inside an actuator housing 50 that is coaxial with the container 14. A tubular portion 52 (FIGS. 1 and 2) of the actuator housing 50 is secured to the orifice plate 20. An outer circumferential surface 54 of the tubular portion 52 is in abutting engagement with the inner circumferential surface 32 of the orifice plate 20.

A burst cup 60 is secured to the inner surface 36 of the orifice plate 20. The burst cup 60 is a cylindrical member which surrounds the actuator housing 50 and the gas heating material 48. The burst cup 60 has a frangible portion 62 adjacent the orifice plate 20.

A diffuser 70 is disposed at the left end (as viewed in FIG. 1) of the inflator 10. The diffuser 70 has a circumferential outer wall portion 72 extending axially from the orifice plate 20. The diffuser outer wall 72 has an outer circumferential surface 74 (FIG. 4) and an inner circumferential surface 76. An annular radially-extending surface 78 of the diffuser 70 extends between the outer and inner surfaces 74 and 76.

The diffuser 70 also has a conical wall portion 80 which extends radially and axially inward from the axially outer end of the diffuser outer wall portion 72. The diffuser conical wall portion 80 terminates in a radially-extending wall portion 82. The wall portion 82 has an annular radially inner surface 84 disposed adjacent to the circumferential outer surface 54 of the actuator housing portion 52.

The diffuser walls 72, 80 and 82, together with the actuator housing portion 52 and the orifice plate 20, define a diffuser chamber 90 in the inflator 10. The discharge openings 40 permit fluid flow from the interior of the burst cup 60 into the diffuser chamber 90. A plurality of radially-extending gas outlets 92 in the diffuser outer wall 72 permit fluid flow from the diffuser chamber 90 out of the inflator 10 and into the air bag (not shown). The gas outlets 92 are disposed in a circular array around the outer periphery of the diffuser 70.

An igniter 94 is secured inside a sleeve 95 that defines a chamber 96 in the tubular actuator housing portion 52. The igniter 94 may be any known igniter suitable to ignite the gas heating material 48. Between the igniter 94, the sleeve 95, and the actuator housing 50 there is a moisture-proof seal. This seal can be arrived at in a number of ways, including welding or crimping. This moisture-proof seal blocks propagation of moisture from the environment around the inflator 10 to the gas heating material 48 along a path between the igniter 94 and the housing 50.

The inflator 10 includes an isolation membrane 100. The isolation membrane 100 is a ring-shaped member which extends symmetrically around the longitudinal central axis 34 of the inflator 10. The isolation membrane 100 is made of a thin, resilient, non-corroding material. Preferably, the isolation membrane 100 is made of stainless steel about 0.003 inches to 0.020 inches thick. The isolation membrane 100 could also be made of another metal or of plastic.

The isolation membrane 100 extends across the diffuser chamber 90 between the discharge openings 40 and the gas outlets 92. The isolation member 100 divides the diffuser chamber 90 into an outer chamber portion 102 and an inner chamber portion 104.

The radially innermost portion of the isolation membrane 100 is a tubular, axially-extending central flange 106 which defines a central opening 107 of the isolation membrane. The central flange 106 (FIG. 2) is disposed between the inner surface 84 of the diffuser wall portion 82 and the outer circumferential surface 54 of the actuator housing tubular portion 52. The diffuser wall portion 82, the isolation membrane flange 106, and the actuator housing portion 52 are welded together with a circumferential weld 108 extending around the actuator housing portion 52. The weld 108 provides a hermetic seal between the diffuser 70, the isolation membrane 100, and the actuator housing 50 at the location of the isolation membrane flange 106.

A conical wall portion 110 of the isolation membrane 100 extends radially outward and axially inward (in a direction toward the chamber 24) from the central flange 102. The conical wall portion 110 extends between the junction of the diffuser 70 and the actuator housing 50, on the one hand, and the junction of the diffuser and the orifice plate 20, on the other hand. The conical wall portion 110 has an inner surface 112 presented toward the orifice plate 20. The conical wall portion 110 has an outer surface 114 presented toward the diffuser 70. The conical wall portion 110 gives the isolation membrane 100 a generally conical configuration and appearance, as can be seen in FIGS. 5 and 6.

Adjacent the junction of the diffuser 70 and the orifice plate 20, the isolation membrane 100 has an annular wall portion 116 which extends radially outward from the conical wall portion 110. Another annular wall portion 118 of the isolation membrane 100 extends axially inward (in a direction toward the chamber 24) from the radial wall portion 116. The axially extending wall portion 118 is in abutting engagement with the circumferential inner surface 76 of the outer wall 72 of the diffuser 70.

The isolation membrane 100 has an annular circumferential outer flange 120. The outer flange 120 extends radially outward from the axial wall portion 118. The flange 120 has parallel inner and outer, radially-extending side surfaces 122 and 124. The flange 120 is clamped axially between the diffuser 70 and the orifice plate 20. The inner surface 122 of the flange 120 is in abutting engagement with the axially outer surface 38 of the orifice plate 20. The outer surface 124 of the flange 120 is in abutting engagement with the axially inner surface 78 of the diffuser outer wall 72. An outer end portion 126 of the flange 120 projects radially outward from the outer surfaces 74 and 30 of the diffuser 70 and orifice plate 20, respectively.

The diffuser wall portion 72, the orifice plate 20, and the isolation membrane flange 120 are welded together with a circumferential weld 128 extending around the outer periphery of the inflator 10. The weld 128 provides a hermetic seal between the diffuser 70, the isolation membrane 100, and the orifice plate 20 at the location of the isolation membrane flange 120.

Most portions of the isolation membrane 100 have one uniform cross-sectional thickness. A stress riser 130 (FIGS. 2, 4 and 7), which is a portion of the isolation membrane 100 having a reduced cross-sectional thickness, is formed in the radial wall portion 116. The reduced cross-sectional thickness of the stress riser 130 results from the presence of an annular groove 132 having an arcuate cross-sectional configuration as viewed in a radial plane. The groove 132 and thus the stress riser 130 extend completely around isolation membrane 100 coaxially with the central axis 34 of the inflator 10.

The inflator 10 further includes a baffle ring 140. As shown separately in FIG. 8, the baffle ring 140 has an annular shape centered on an axis 141, and has a semicircular radial profile spaced from the axis 141. The annular shape of the baffle ring 140 is defined by first and second annular edge surfaces 142 and 144 which are spaced radially from each other. The annular edge surfaces 142 and 144 lie in a common plane which is perpendicular to the axis 141, and are both centered on the axis 141.

The semicircular radial profile of the baffle ring 140 is defined by a concave inner side surface 146 and an oppositely facing, convex outer side surface 148. Each of the side surfaces 146 and 148 extends radially between the annular edge surfaces 142 and 144, and extends circumferentially around the axis 141. An inner diameter d1 of the baffle ring 140 is defined by the circular juncture 150 of the first annular edge surface 142 and the outer side surface 148. An outer diameter d2 of the baffle ring 140 is defined by the circular juncture 152 of the second annular edge surface 144 and outer side surface 148. The baffle ring 140 is preferably formed of a metal such as, for example, aluminum or steel, but may alternatively be formed of a plastic material.

Figure 2:
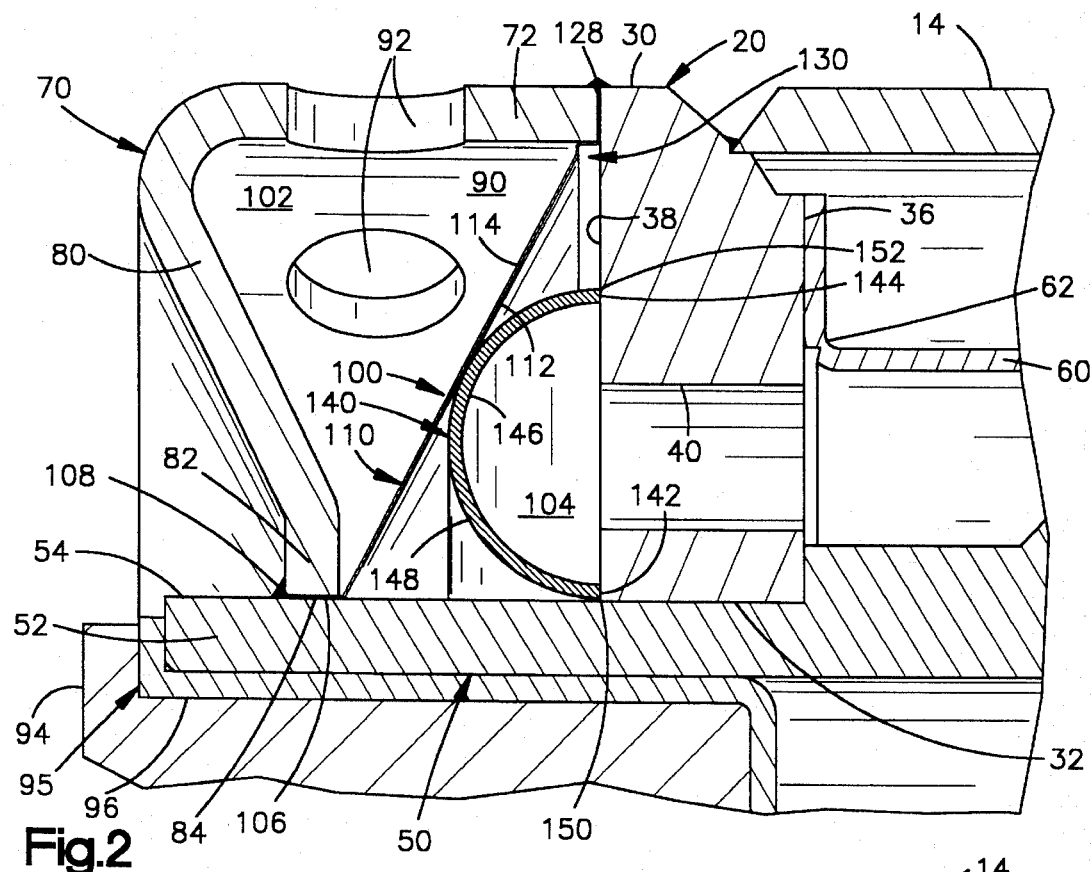
FIG. 2 is an enlarged fragmentary sectional view of a portion of the inflator of FIG. 1.

As shown in FIGS. 1 and 2, the baffle ring 140 is located in the inner portion 104 of the diffuser chamber 90. The baffle ring 140 is thus located between the isolation membrane 100 and the discharge openings 40 in the orifice plate 20. More specifically, the baffle ring 140 is received coaxially over the outer circumferential surface 54 (FIG. 2) on the tubular portion 52 of the actuator housing 50. The inner diameter d1 (FIG. 8) of the baffle ring 140 is preferably equal to, or just slightly greater than, the diameter of the outer circumferential surface 54.

The first annular edge surface 142 of the baffle ring 140 abuts the outer side surface 38 of the orifice plate 20 at a location radially inward of the discharge openings 40. The second annular edge surface 144 of the baffle ring 140 abuts the outer side surface 38 of the orifice plate 20 at a location radially outward of the discharge openings 40. Accordingly, the concave inner side surface 146 of the baffle ring 140 extends radially across the discharge openings 40 between those locations, and extends circumferentially across the discharge openings 40 around the entire circular array of discharge openings 40.

The baffle ring 140 is not attached to the tubular portion 52 of the actuator housing 50, the diffuser plate 20, or the isolation membrane 100. However, the conical wall portion 110 of the isolation membrane 100 holds the baffle ring 140 axially against the diffuser plate 20. In the preferred embodiment of the present invention, the conical wall portion 110 of the isolation membrane 100 is not deflected substantially by the pressure with which it engages the baffle ring 140. The inner side surface 112 of the conical wall portion 110 thus extends tangentially across the convex outer side surface 148 of the baffle ring 140.

The inflator 10 is normally in the unactuated condition shown in FIGS. 1 and 2. The igniter 94 is not actuated, and the gas heating material 48 is not ignited. The burst cup 60 is disposed in the position shown in the solid lines in FIG. 1 with its frangible portion 62 unbroken. The gas outlets 92 are open into the outer portion 102 of the diffuser chamber 90 and the discharge openings 40 are open into the inner portion 104 of the diffuser chamber 90. The isolation membrane 100 blocks fluid flow across the diffuser chamber 100 between the discharge openings 40 and the gas outlets 92. The isolation membrane 100 thus blocks fluid flow from the ambient environment of the inflator 10 through the discharge openings 40 into the interior of the inflator 10.

In the event of a vehicle collision exceeding a predetermined threshold level of severity, the igniter 94 is actuated in a known manner to ignite the gas heating material 48. Ignition and combustion of the gas heating material 48 generates combustion products including heat, hot particles, and gas which applies pressure against the closed end of the burst cup 60. The burst cup 60 breaks at its frangible portion 62 and moves to the position shown in dashed lines in FIG. 1. The stored gas in the chamber 24 is then heated by the combustion products and flows out of the chamber 24 through the discharge openings 40. The gas flows through the discharge openings 40 into the inner portion 104 of the diffuser chamber 90.

The gas flowing into the inner portion 104 of the diffuser chamber 90 moves forcefully against the inner side surface 146 of the baffle ring 140. The baffle ring 140 then transmits a fluid pressure force from the flowing gas to the isolation membrane 100. The baffle ring 140 applies the fluid pressure force to the isolation membrane 100 where the outer side surface 148 of the baffle ring 140 adjoins the inner side surface 112 of the isolation membrane 100. The fluid pressure force which is thus exerted upon the isolation membrane 100 stresses the isolation membrane 100 in a direction away from the discharge openings 40. The stress riser 130 is the weakest portion of the isolation membrane 100. Therefore, when the fluid pressure force on the isolation membrane 100 exceeds the rupture strength of the material at the stress riser 130, the isolation membrane ruptures at a known location, i.e., at the stress riser 130.

When the isolation membrane 100 has been ruptured in the foregoing manner, the gas flowing forcefully outward against the baffle ring 140 moves the baffle ring 140 axially outward from the orifice plate 20 along the tubular portion 52 of the actuator housing 50. The baffle ring 140 pushes the conical wall portion 110 of the isolation membrane 100 axially outward from the position of FIG. 2 to the position of FIG. 3. The gas then flows across the diffuser chamber 90 from the discharge openings 40 to the gas outlets 92.

Figure 3:
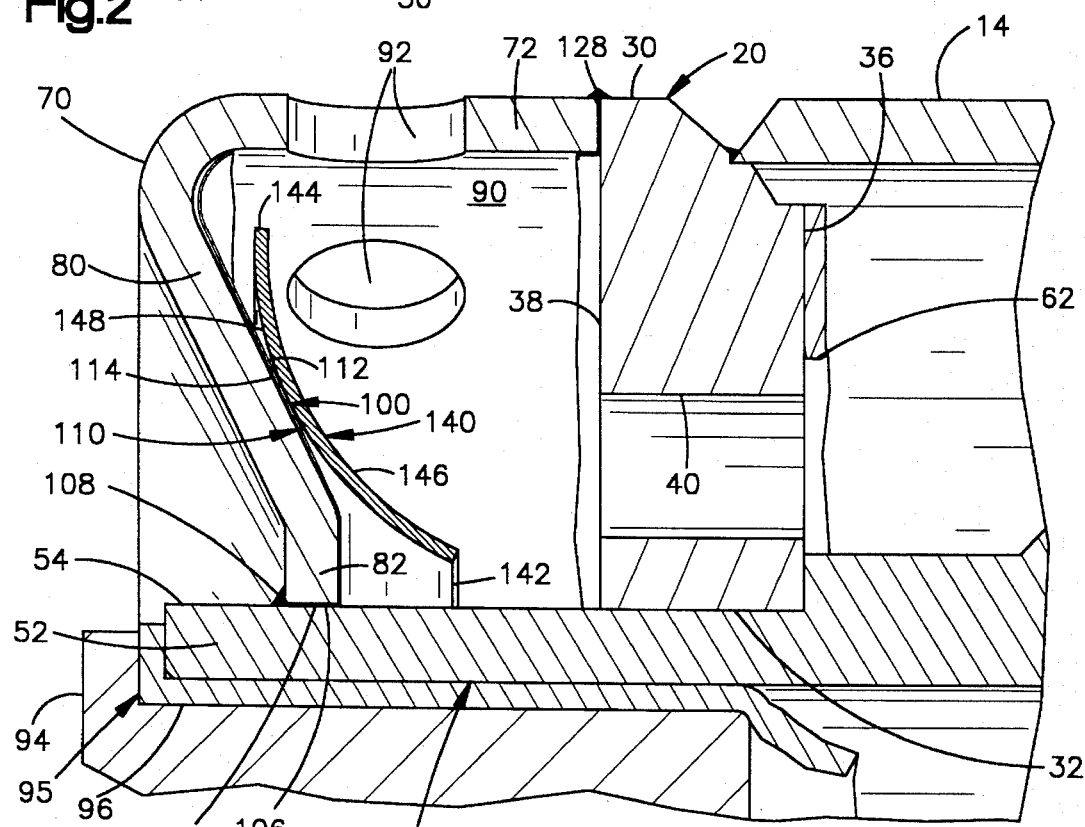
FIG. 3 is a view, similar to FIG. 2, illustrating the relationship between parts of the inflator of FIG. 1 after the inflator has been actuated.

As shown in FIG. 3, the baffle ring 140 is preferably deflected out of the gas flow path extending across the diffuser chamber 90 directly from the discharge openings 40 to the gas outlets 92. The isolation membrane 100 also is deflected by the force of the flowing gas, but is substantially shielded by the baffle ring 140 from direct impingement by the gas as the gas flows axially from the discharge openings 40 toward the isolation membrane 100. This helps to ensure that the isolation membrane 100 is not fragmented by the force of the flowing gas.

In accordance with the foregoing feature of the present invention, the baffle ring 140 is stronger than the isolation membrane 100 so as to have a greater resistance to being fragmented by the force of the flowing gas. This can be accomplished by forming the baffle ring 140 of a material that is stronger than the material of the isolation membrane 100, or by forming the baffle ring 140 of a similar material, but with a rigidfying structural feature. For example, in the preferred embodiment of the present invention, the baffle ring 140 and the isolation membrane 100 are both formed of steel, but the baffle ring 140 has a substantially greater thickness for a correspondingly greater resistance to deflection and fragmentation.

Because the isolation membrane 100 is welded in place in the inflator 10, air or moisture cannot pass around the unbroken isolation membrane 100. Thus, the isolation membrane 10 forms a hermetic seal between the gas outlets 92 which are exposed to the environment around the inflator 10, and the discharge openings 40 which are exposed to the gas heating material 48 and other parts inside the inflator 10.

The isolation membrane 100 is resilient and can flex in the event of pressure differentials which may occur with temperature, air pressure, and altitude variations to which the inflator 10 is exposed. In the event of such pressure changes, the axially-extending wall portion 118 (FIG. 4) of the isolation membrane 100, which is not welded or otherwise secured to the diffuser outer wall 72, can pull away from the diffuser wall in a radially inward direction as indicated by the arrow 160. This resiliency of the isolation membrane 100 also reduces the tendency for degradation of the connections between the isolation membrane 100 and the housing 12.

From the above description of the invention, those skilled in the art will perceive improvements, changes, and modifications in the invention. Such improvements, changes, and modifications within the skill of the art are intended to be covered by the appended claims.

Having described the invention, the following is claimed:

1. Apparatus comprising:
    container means for containing inflation fluid under pressure, said container means having a discharge opening for discharging a flow of said inflation fluid;
    closure means for releasing said inflation fluid to flow outward through said discharge opening upon rupturing of said closure means;
    isolator means for providing a hermetic seal which isolates said discharge opening from the ambient atmosphere, said isolator means being located between said discharge opening and said ambient atmosphere; and
    baffle means for shielding said isolator means from direct impingement by said flow of inflation fluid and for applying an inflation fluid pressure force to said isolator means so as to open said hermetic seal under the influence of said flow of inflation fluid, said baffle means being located between said discharge opening and said isolator means.

2. Apparatus as defined in claim 1 wherein said container means contains a pressurized quantity of stored inflation gas, said container means further containing ignitable gas heating material which, when ignited, generates combustion products for heating said stored inflation gas.

3. Apparatus as defined in claim 1 wherein said baffle means transmits said fluid pressure force to said isolator means so as to open said hermetic seal by rupturing a predefined rupturable portion of said isolator means.

4. Apparatus as defined in claim 1 wherein said baffle means is unattached to said container means.

5. Apparatus as defined in claim 1 wherein said discharge opening is one of a plurality of similar discharge openings in a circular array centered on an axis, said baffle means being located axially between said discharge openings and said isolator means.

6. Apparatus as defined in claim 5 wherein said baffle means comprises a baffle ring centered on said axis.

7. Apparatus as defined in claim 6 wherein said container means has a surface extending in a plane perpendicular to said axis, said discharge openings being open at said surface, said baffle ring contacting said surface at a first location radially inward of said discharge openings and at a second location radially outward of said discharge openings.

8. Apparatus as defined in claim 7 wherein said baffle ring is unattached to said surface and is pressed against said surface by said isolator means.

9. Apparatus as defined in claim 7 wherein said baffle ring has a concave inner side surface facing toward said discharge openings, said concave inner side surface extending radially across said discharge openings between said first and second locations.

10. Apparatus as defined in claim 7 wherein said baffle ring has a convex outer side surface facing toward said isolator means, said isolator means having a conical inner side surface tangentially adjoining said convex outer side surface of said baffle ring.

11. Apparatus comprising:
    container means for containing a pressurized quantity of stored inflation gas and an ignitable gas heating material which, when ignited, generates combustion products for heating said inflation gas, said container means having a circular array of discharge openings for discharging a flow of said inflation gas;
    closure means for releasing said flow of inflation gas to flow outward through said discharge openings upon rupturing of said closure means;
    isolator means for providing a hermetic seal which isolates said discharge openings from the ambient atmosphere, said isolator means being located between said discharge openings and said ambient atmosphere; and
    a baffle ring coaxial with said circular array of discharge openings, said baffle ring being located between said discharge openings and said isolator means and being supported for movement against said isolator means under the influence of said flow of inflation gas.

12. Apparatus as defined in claim 11 wherein said baffle ring is unattached to said container means.

13. Apparatus as defined in claim 11 wherein said baffle ring and said circular array of discharge openings are coaxial with a tubular wall portion of said container means, said baffle ring being supported for movement axially along said tubular wall portion in a direction extending from said discharge openings toward said isolator means under the influence of said flow of inflation gas.

14. Apparatus as defined in claim 13 wherein said circular array of discharge openings is located on an orifice plate portion of said container means which projects radially outward from said tubular wall portion of said container means, said isolator means holding said baffle ring axially against said orifice plate portion of said container means.

15. Apparatus as defined in claim 14 wherein said baffle ring has a concave inner side surface facing toward said discharge openings and a convex outer side surface facing toward said isolator means, said isolator means extending axially and radially from said tubular wall portion of said container means to said orifice plate portion of said container means, said isolator means having a conical inner side surface tangentially adjoining said convex outer side surface of said baffle ring.

\* \* \* \* \*